Patented Jan. 7, 1941

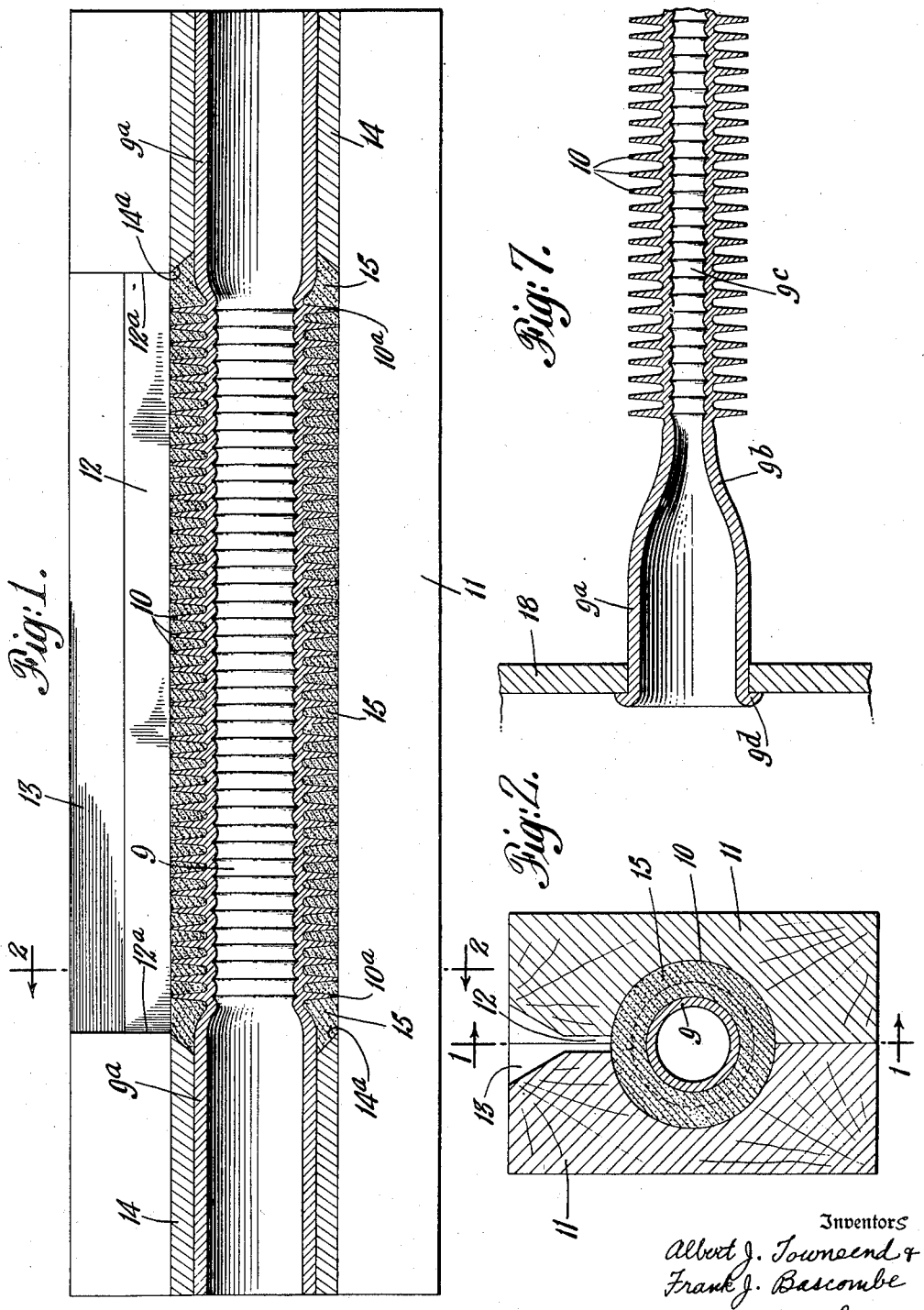

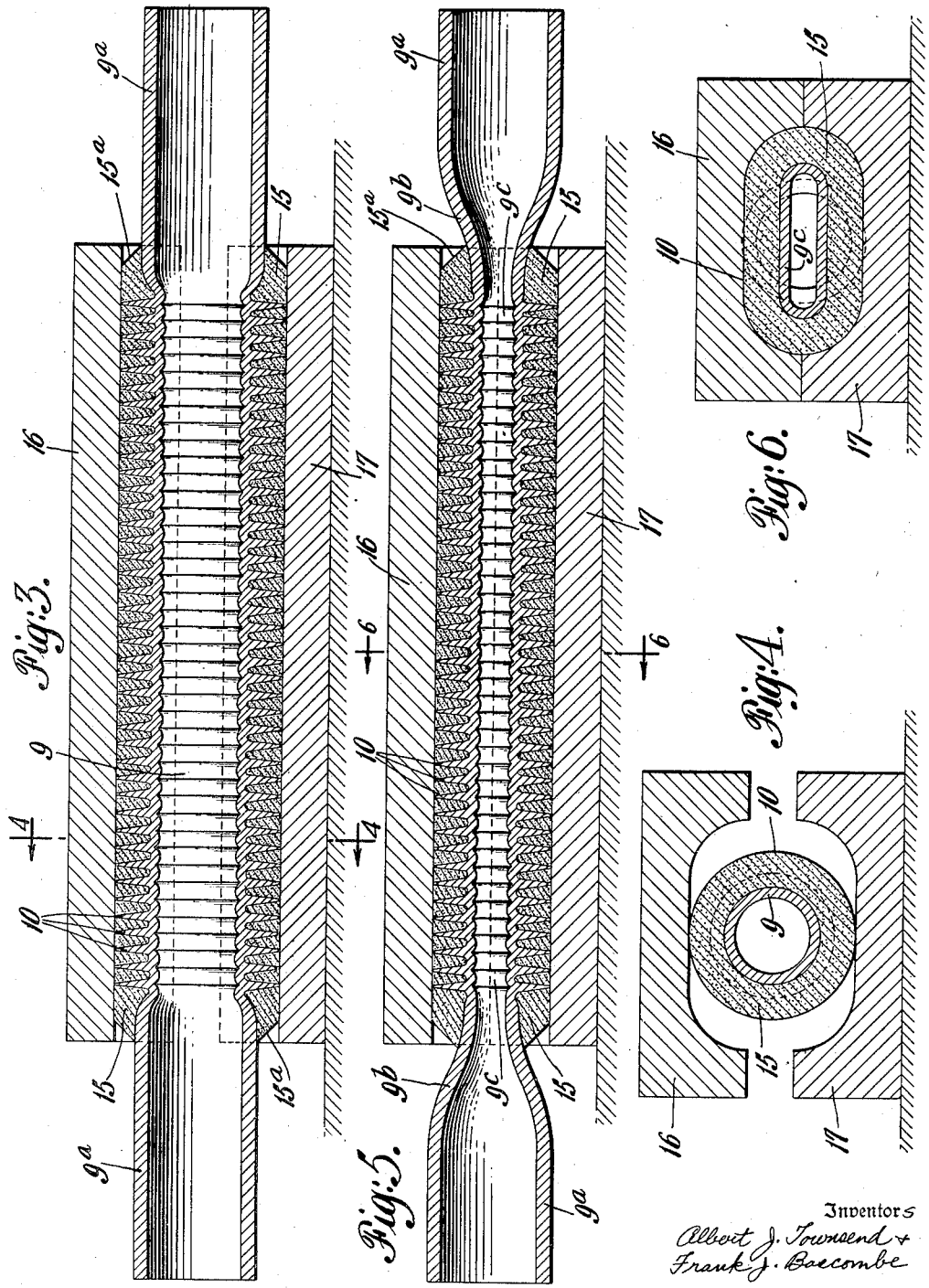

2,227,680

UNITED STATES PATENT OFFICE 2,227,680

FINNED TUBING OR THE LIKE

Albert J. Townsend and Frank J. Bascombe, Lima, Ohio

Original application December 18, 1935, Serial No. 55,072. Divided and this application February 3, 1939, Serial No. 254,356

2 Claims. (Cl. 257—262)

This invention relates to finned tubing or the like, and is a division of our copending application Serial No. 55,072, filed December 18, 1935, now Patent No. 2,179,530, dated November 14, 1939.

In general, the invention has to do with articles having fins or other protuberances; and more especially it contemplates a novel integral finned tubing of non-circular or flattened cross-section; and though not limited to being made by the method disclosed in our said copending application, the invention is inclusive of articles made by said method.

The advantages of the invention may be better understood after some consideration of finned tubing in general, and one of its uses. The chief use of finned tubing is as a heat-transfer or radiating element, and for this purpose some tubes have longitudinal fins, some have spiral fins, others circular fins, and still others isolated projections of various kinds. Regardless of the type of fins, however, it is customary, because of simplicity of manufacture, to employ tubes of circular cross-section, even though these are relatively inefficient as to heat transfer and wasteful of space when assembled in a bank and leave relatively dead spaces in the interstices between tubes.

In order to overcome these difficulties, tubes of non-circular, for example oval or flattened, cross-section have heretofore been developed, which, in addition to cutting down the interstices in a tube bundle and increasing the amount of tubing which can be presented within a given "face area" to the transversely flowing external cooling or heating medium, also substantially reduce the distance from the inside of the tube wall to the center of the flowing stream of internal heating or cooling medium; but ordinarily such tubes are made as castings which are heavy, crack easily, and are incapable of being bent, or else they are formed as plain flat-section tubes to which the fins are separately attached as by soldering or welding which is costly, tends to weaken the tube itself, and reduces the heat transfer.

One of the primary objects of the present invention is the production of flattened or other non-circular finned tubes or equivalent articles having the various known advantages, without the disadvantages heretofore encountered. A further object is the production of a new article of this general category having certain heretofore unknown characteristics and advantages.

More particularly, the invention contemplates: a novel finned tube or the like of flattened or non-circular cross-section; preferably one having a major and a minor axis, for example of elliptical or oval cross-section; also such a tube of ductile metal or other bendable material, and having integral finning; further, a non-circular finned tube with circular end portions adapted for easy installation in and removal from tube-plates or headers; and still further, a tube in which the metal of the fins may be strengthened or rendered somewhat thicker adjacent the regions of the relatively flat faces of the tube wall; and specifically, but not exclusively, such a tube when made from known types of round-section tubing by imposing the desired shape on the article without appreciably rippling or otherwise detrimentally affecting the thin fins thereof.

Still more specifically, the invention in its preferred embodiment involves: the provision of a ductile metallic tube of non-circular section with integral radial or circumferential radiating fins; and the provision of such a tube formed from a finned tube of round section (for instance a copper, brass, or aluminum alloy tube) by infilling the interspaces between fins with a deformable but substantially incompressible matrix or material, preferably non-adherent, such as lead, Babbitt metal, other ductile material or the like, then working the article to the desired shape, and thereafter removing the filler, as by melting the same.

How these and other objects and advantages are attained by the present invention will be evident to those skilled in the art after perusal of the following description, taken together with the accompanying drawings which illustrate the preferred practice of the invention.

Figure 1 is a longitudinal sectional view through a round-section finned tube, in position within a horizontal mold (the view being taken on the line 1—1 of Figure 2, to show in elevation one half of the mold which is of longitudinally split form), with ferrules in place around the ends of the tube, and showing a matrix or body of material infilled into the interspaces between fins;

Figure 2 is a section through the tube and the complete mold, taken on the line 2—2 of Figure 1, and also showing the filling material;

Figure 3 is a longitudinal section through the encased or infilled tube, removed from the mold and ferrules, and positioned between a pair of press members preliminary to the forming operation;

Figure 4 is a section taken on the line 4—4 of Figure 3;

Figure 5 is a longitudinal section similar to Figure 3 but illustrating the tube as compressed between the press members;

Figure 6 is a section taken on the line 6—6 of Figure 5; and

Figure 7 is a view of a portion of a finished tube fitted into a tube-plate or header member.

By reference to Figures 1 and 2, it will be seen that a circular-section, ductile, metallic tube 9, having integral spaced-apart heat-transfer elements or circular fins 10, is positioned within the bore or hollow of a retaining box or mold made of two halves 11, 11, the latter being of wood or any other suitable material. Such finned tube or like article may be of any standard or commercially available type suitable for the purpose, such, for example, as the round circular-finned tubing illustrated in the Hoffman U. S. patents numbered 1,842,095 and 1,902,779. Various other types of tubes, for example spiral-fin tubes, can be equally well handled in accordance with the present invention, see for instance the tubing of the Locke Patent No. 1,761,733. The tube may be of any desired length, with plain or flanged end portions of any preferred formation; the tube here shown having straight end portions 9a, of annular cross-section, adaptable to ultimate mounting in any desired manner in tube-plates or the like.

Communicating with the bore of the mold 11 may be one or more openings for the feeding of the filling material to the tube fin interspaces, and in the present instance the feeding opening takes the form of a long slot 12, extending lengthwise throughout and preferably slightly beyond the zone of the finned portion of the tube. This slot or channel may be formed in one or the other of the two mold pieces (where a split mold is employed) or preferably, as here shown, the inner face of each mold member is cut back, so that the two jointly form the slot indicated at 12 which extends from the point 12a adjacent one end of the finned region to the opposite point 12a adjacent the other end of said region. The slot is widened at the top, to form a wide-mouthed groove as indicated at 13, to facilitate the pouring of the infilling material, such as molten lead.

While the feeding slot may be arranged to extend along only a portion of the length of the finned region if it be desired to flatten or otherwise deform only that portion; or while the feeding slot may be coextensive with the length of the finned region, in which event the end fins 10a would serve as closures for the mold bore; the present preferred practice is, as above stated, to extend said slot beyond both ends of the fin zone and to insert a pair of ferrules 14 (which may really be considered as a part of the mold itself, and might alternatively be formed integrally therewith) into the ends of the mold blocks in surrounding relation to the tube ends 9a. These ferrules may be of hard fiber, or of metal, or other suitable material, and are preferably formed with a sloping or reamed end face 14a, the outer peripheral edge of which may register with the ends 12a of the feed slot 12.

With the above described arrangement, when the filling material 15, preferably lead, is poured into the mold, it solidifies to form a deformable matrix embedding the fins and projecting at each end beyond the fin area to form sloping or tapering shoulders 13a, the advantages of which will be apparent after consideration of Figures 3 to 6. While various other materials may be used, lead is preferred, as it is cheap, will solidify in the fin interspaces without adhering to the fins, is deformable but at the same time not so soft as to permit appreciable transverse rippling of the fins during the subsequent tube-flattening operation, and also has a lower melting point than the usual metal tube and may be readily melted off and used again.

The lead-encased tube, after removal from the mold, is placed between suitable dies or rolls, or plain press members of a form shown at 16, 17, in Figures 3 and 4. By application of pressure the lead-sheathed tube is then flattened (or otherwise shaped or formed) to any desired extent, as illustrated in Figures 5 and 6. The press members may be made of a length suited to the intended area to be flattened; and where, as here shown, the entire finned zone is to be flattened, these members may extend slightly beyond the region of the fins, so as to overlie the tapered ends 15a of the encasement. By this arrangement, the distribution of pressure is such that a gradual taper of the tube wall is formed at 9b, intermediate the round tube ends 9a and the flattened tube region 9c.

The final step in the formation of the tube is to remove the matrix, as by melting the same from the tube. The finished flattened tube comes out perfectly clean, undamaged, with its fins in good alignment and apparently somewhat thickened or strengthened in the region of the flattened sides of the tube, and in a condition suitable for use as a straight tube or to be bent into elbows and the like.

A portion of a finished tube is shown in Figure 7, which also illustrates how such tubes may be assembled between a pair of tube-plates or headers 18 (one of which is fragmentarily illustrated); the round ends 9a of the tube being readily adapted to any ordinary type of joint between tubes and headers, such as welding, or by rolling over the end of the tube as shown as 9d, while the flattened portions of the tubes make possible a much closer spacing of tube centers, in one direction of the tube bundle, than could otherwise be arranged.

It will also be readily understood that the flattened cross-sectional shape of the interior of the tube results in a more intimate and uniform contact of the internal heating or cooling medium with the heat-transfer surface. It will further be obvious that the close spacing of the tube centers, in the direction transverse to the flowing stream of external cooling medium as compared with round-section tubes makes it possible to get more tubes into a given front face area, the possible increase being nearly 50%.

The importance of this last-named advantage will be better understood by considering an example. In a condensing locomotive, for instance, where space is at a premium, a substantially increased number of our improved tubes can be subjected to a cooling air blast of predetermined flow area, while at the same time the efficiency of each individual tube is greater than that of the ordinary tube. One of the very important results, therefore, would be the substantial reduction in overall volume of space required by the condenser and air duct installation, considered as a whole, for a given condensing capacity.

While the preferred article and method and means for forming the same, have been illustrated in the drawings, others might be alternatively employed, while still falling within the broad scope of the present invention. The article itself is claimed herein; but the method and means for forming the same are claimed in our said copending application, of which the present case is a division.

We claim:

1. As a new article of manufacture, ductile tubing of partially flattened cross-section with integral circumferential finning which is of somewhat greater thickness adjacent the flattened portions of the tubing walls than elsewhere.

2. As a new article of manufacture, ductile metallic tubing of partially flattened cross-section with integral circumferential finning which is cold-worked to somewhat differing thicknesses adjacent the round and the flattened portions of the tubing walls, said finning being strengthened by the working and having its greater thickness adjacent the flattened portions of said walls.

ALBERT J. TOWNSEND.
FRANK J. BASCOMBE.